D. ROBERTS.
TOOL.
APPLICATION FILED SEPT. 17, 1920.
1,414,750.
Patented May 2, 1922.
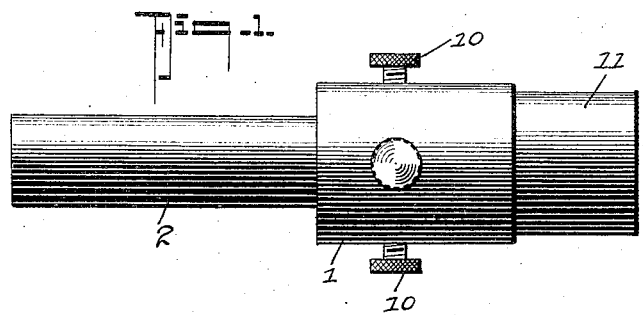
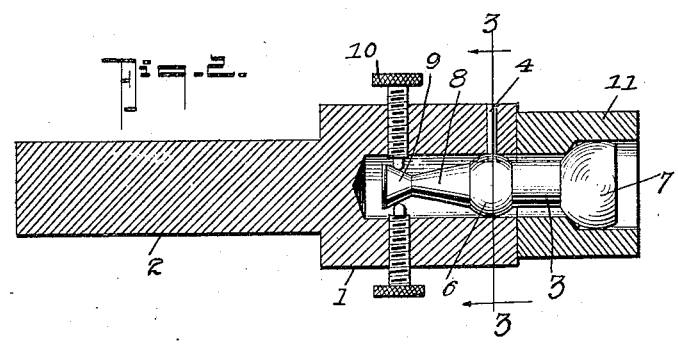
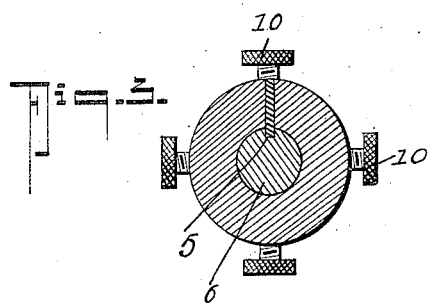
WITNESSES
INVENTOR
D. Roberts.
BY
ATTORNEYS

UNITED STATES PATENT OFFICE.

DAVID ROBERTS, OF WILKINSBURG, PENNSYLVANIA, ASSIGNOR OF ONE-HALF TO LESTER HEADRICK, OF WILKINSBURG, PENNSYLVANIA.

TOOL.

1,414,750. Specification of Letters Patent. Patented May 2, 1922.

Application filed September 17, 1920. Serial No. 410,970.

*To all whom it may concern:*

Be it known that I, DAVID ROBERTS, a subject of the King of Great Britain, and a resident of Wilkinsburg, in the county of Allegheny and State of Pennsylvania, have made certain new and useful Improvements in Tools, of which the following is a specification.

My invention is an improvement in tools, and has for an object to provide a tool for use in tool making, or wherever holes are to be bored and accuracy is essential for measuring accurately from the true axis of the spindle of a boring or drilling machine tool.

Another object is to provide means to measure accurately from the true axis of the spindle of any boring or drilling machine tool, when holes are to be placed in work at accurate positions and dimensions and to do this with the greatest saving in time.

In the drawings:

Figure 1 is a plan view of the improved tool.

Figure 2 is a longitudinal section.

Figure 3 is a section on the line 3—3 of Fig. 2.

The improved tool which is designed to be held in a chuck or in any other suitable means, comprises a socket piece 1 having at one end means indicated at 2 for engagement by the chuck. This socket piece has arranged therein a lever indicated at 3, and the lever is connected with the socket piece in such manner that it may move longitudinally, but may not turn independently of the socket piece. This connection is by means of a key 4 which passes through the socket piece and engages a keyway 5 in a ball or spherical portion 6 intermediate the ends of the lever.

At one end the lever has a spherical head 7 which is adapted to be engaged by the work, and at the other end the lever has oppositely arranged tapering portions 8 and 9, the said portions having their small ends adjacent and connected. The large end of the tapering portion 8 is adjacent to the spherical portion 6, while the large end of the tapering portion 9 is remote from the said spherical portion.

A button 11 is held against the end of the socket piece by the head 7, the button having its bore reamed or counterbored to receive the head. The end of this buttton or sleeve bears against the end of the socket piece. Four set screws indicated at 10 are threaded through the socket piece at points 90 degrees apart, and these set screws engage the tapering portion 9 of the lever. The inner ends of the said set screws are smooth and rounded as shown, and it will be obvious that by turning the screws the lever may be moved longitudinally, and it may be swung on its minor axis, the ball 6 acting as a fulcrum.

In using the improved tool, for instance to bore holes, the tool for tool making is placed in a chuck or other holding means, on the horizontal spindle of a milling machine, and any standard indicator registering .001 of an inch is brought to bear in contact with the peripheral surface of the button 11 in the same plane with one of the set screws 10. By turning the spindle, the indicator will register the amount that the buttons runs out of true, and after the first reading has been taken in the same plane with one of the set screws 10, the button is rotated one-half turn and a reading is taken in the same plane with a diametrically opposite set screw. The position of the button is now corrected on this diameter by turning the set screws. Afterwards the button is tested in the planes with the two other set screws and its position is corrected by the two said set screws. It will be obvious that now the button is in register with the true axis of the spindle. The position of the button on the two diameters is adjusted by loosening one set screw and tightening the other.

The work is now secured to the table, square with the spindle and ready to be bored. Half of the diameter of the button 11, that is, the radius of the button, is added to the height of the first hole to be bored from the base of the work. Say, for instance, that the height of this hole is 4.5", the button radius .3" is added to this dimension, making a total of 4.8". This dimension, 4.8" is set on any standard height gage, and the table of the machine is moved to a position such that the height gage measures 4.8" from the table to over the top of the button.

Next a parallel piece is clamped to the side of the work, extending out from the said side. Say, for instance, that the distance from the side of the work to the first hole is 1.5", the thickness of the parallel piece .5″, this total amount of 2″ is added to the radius of the button, making a total of 2.3″. A 3″ micrometer is now used and the table is moved lengthwise of the machine, until the spindle of the machine is in direct line with the hole to be bored. Any number of holes may be set in the same manner.

I claim:—

1. A device of the character specified, comprising a socket piece having at one end means for engagement by a chuck or the like, a lever mounted in the bore of the socket piece and having intermediate its ends a ball or spherical portion, and having a keyway at the said portion, the socket piece having a key engaging the keyway for permitting the lever to move longitudinally and for restraining it from rotation, said lever extending beyond the socket piece, and means engaging the inner end of the lever for moving it longitudinally and for swinging it laterally on the ball as a fulcrum, said means comprising set screws threaded through the socket piece, the lever having a tapering portion for engagement by the set screws, said lever having a head at its outer end, and a button provided with a bore abutting the end of the socket piece in which the spherical portion or ball is seated the bore of the button being reamed to receive the lever head.

2. A device of the character specified, comprising a socket piece having at one end means for engagement by a chuck or the like, a lever mounted within the bore of the socket piece and having intermediate its ends a ball or spherical portion, and having a keyway at the said portion, the socket piece having a key engaging the keyway for permitting the lever to move longitudinally and for restraining it from rotation, said lever extending beyond the socket piece, and means engaging the inner end of the lever for moving it longitudinally and for swinging it laterally on the ball as a fulcrum, said means comprising set screws threaded through the socket piece, the lever having a tapering portion for engagement by the set screws.

3. A device of the character specified, comprising a socket piece having at one end means for engagement by a chuck or the like, a lever within the socket piece and having intermediate its ends a ball or spherical portion and having a keyway at the said portion, the socket piece having a key engaging the keyway for permitting the lever to move longitudinally and for restraining it from rotation, said lever extending beyond the socket piece, and means engaging the inner end of the lever for moving it longitudinally and for swinging it laterally on the ball as a fulcrum.

4. A device of the character specified, comprising a socket piece having at one end means for engagement by a chuck or the like, a lever within the socket piece, and having an enlargement intermediate its ends, forming a fulcrum on which the lever rocks, a button supported by the outer end of the socket piece and having a circular cross section, and means engaging the inner end of the lever for swinging the same laterally in two directions at right angles with respect to each other.

5. A device of the character specified, comprising a socket piece having means for engagement by a chuck at one end, a lever within the socket piece mounted to rock therein on a fulcrum intermediate its ends and extending at one end beyond the socket piece, said end carrying a button, and means in connection with the socket piece and the other end of the lever for rocking said lever in planes crossing at a right angle.

DAVID ROBERTS.